United States Patent [19]
Dorr

[11] Patent Number: 4,772,764
[45] Date of Patent: Sep. 20, 1988

[54] SOUNDWAVE POSITION DIGITIZER

[75] Inventor: John A. Dorr, Crofton, Md.

[73] Assignee: Xecutek Corporation, Annapolis, Md.

[21] Appl. No.: 556,804

[22] Filed: Dec. 1, 1983

[51] Int. Cl.[4] ............................................. G08C 21/00
[52] U.S. Cl. ..................................... 178/18; 367/907; 367/117; 340/706
[58] Field of Search ................... 178/18, 19; 181/175; 367/907, 117, 151

[56] References Cited
U.S. PATENT DOCUMENTS
3,733,580  5/1973  Beekem ............................... 367/151
4,317,005  2/1982  de Bruyne ........................ 178/18 X Primary Examiner—Stafford D. Schreyer
Attorney, Agent, or Firm—Jim Zegeer

[57] ABSTRACT

A sound wave position digitizer has a pair of sound wave beam transducers, each spaced a predetermined distance from the edges of a data surface such that the beams intersect on the data surface at substantially orthogonal angles. The beams are folded by reflectors to achieve compactness and, to further improve the form factor, the beams are coupled to the folding reflectors by acoustic horns which intersect and have a common section.

30 Claims, 8 Drawing Sheets

FIG. 1

$\pm\delta$ = RANGE UNCERTAINTY

= AREA OF UNCERTAINTY $\epsilon$ = MAXIMUM LINEAR UNCERTAINTY

SOUNDWAVE POSITION DIGITIZER

BACKGROUND AND BRIEF DESCRIPTION OF THE INVENTION

Sound wave digitizers are known in the art as shown, for example, in U.S. Pat. No. 4,317,005 and in U.S. Pat. No. 4,012,588. In U.S. Pat. No. 4,317,005, a pair of linear or Sell-type transducers bound a pair of intersecting edges of a data surface and transmit acoustic waves to a passive reflecting target, such as a stylus. Reflected waves are detected and the timing thereof determined to locate the target by its coordinates. In FIG. 3 of U.S. Pat. No. 4,012,588, a transmitting transducer emits sound waves from an edge of a data space and reflected waves are received by a pair of receivers at the corners of the same edge of the data space and isolated from the transmitting transducer by acoustic barriers, and a triangulation computation is made to determine the location of an object in the data space.

Low cost narrow beam electrostatic transducers are well known in the art. In my U.S. application Ser. No. 496,158, filed May 19, 1983, and entitled "EFFICIENT LOW COST TRANSDUCER SYSTEM" now U.S. Pat. No. 4,530,077 I disclose a novel ultrasonic transducer using a low cost narrow beam electrostatic transducer coupled with a beam transformer or acoustic lens located in the near field thereof for controllably expanding the transmitted beam in one dimension.

The object of the present invention is to provide an improved two dimension sound wave digitizer. A further object of the invention is to provide a sound wave digitizer or data entry device using low cost transducers. Another object of the invention is to provide a compact sound wave digitizer.

In accordance with this invention, a pair of sound wave beam transducers transmit a pair of angularly related sound beams along orthogonally related paths across a data surface; the beam transducers being spaced from intersecting edges of the data surface a distance substantially equal to the maximum edge dimension of the data surface so that the sound beams impinging on an object over the data surface are substantially orthogonal. The sound beams are preferably in the ultrasonic range propogated in air.

In accordance with a preferred form of the invention, a pair of low cost narrow beam electrostatic transducers combined with conical beam transformers are spaced at a distant remote point from the edge of a data surface wherein a randomly movable object, such as a stylus or human finger or other object, may be located. The spacing of the transducer from the edge is such that the angle at any intersection point of the beams is substantially orthogonal. The beams are folded 180 degrees to achieve compactness and the form factor is enhanced by the beams being coplanar and coupled to the folding acoustic mirror by intersecting coplanar acoustic horns. Sound absorbing material is utilized to form beam boundaries in said acoustic horns.

BRIEF DESCRIPTION OF THE DRAWINGS:

The above and other objects, advantages and features of the invention will be better understood when considered with the following specification and accompanying drawings wherein;

FIG. 7 illustrates one preferred form of a target.

DETAILED DESCRIPTION OF THE INVENTION

The invention disclose herein is, in its preferred embodiment, a folded path ultrasonic, two-dimension digitizer. A two-dimension digitizer is a device which enables encoding of two-dimensional graphic data and/or digital encoding of a position in a two-dimension coordinate system such as serial digital bit streams, for example. In its preferred embodiment, the invention employs two ultrasonic transducers 10 and 11 deployed at either end of a base line 12 to measure two ranges R1 and R2 to an acoustic-target through the conventional method of timing the arrival of the echo signal from the target 15. According to the invention, and as shown later, the path of the acoustic pulse from either transducer to the target and back may be folded (that is the transducer and target need not be in the same plane) to achieve a greater base-line length without extending the area required for the device and by folding the beams 180 degrees, the volumetric space is greatly reduced.

As noted above, heretofore, sound wave digitizers employed linearly distributed, specially designed transducers to avoid the errors inherent to compact range-range positioning techniques. This invention permits the use of low cost centrally located commercially available ultrasonic transducers instead of the linear transducers and thereby gaining a cost advantage and at the same time, achieving a higher degree of accuracy.

Figures 1, 2:
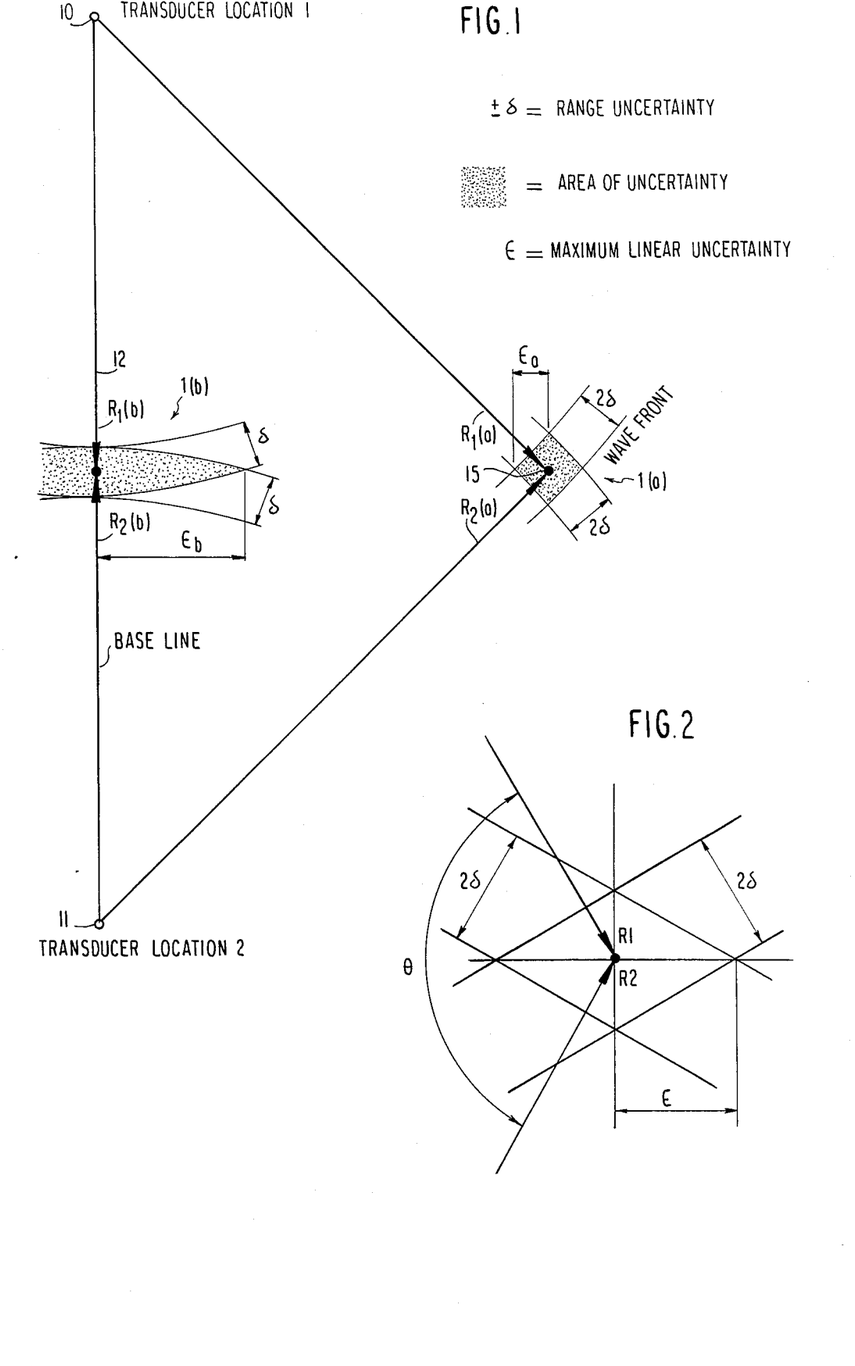
FIG. 1 is a schematic view illustrating the orthogonality effect as used in the invention.
FIG. 2 is a schematic view for the trigometric analysis of the orthogonality effects as used in the invention.

The uncertainty in determining position through two measurements of range from different known locations is affected not only by the precision of the range measurement but also by the orthogonality between the two measurements. In this invention orthogonality is meant the degree to which the intersection of the two range vectors approximates a right angle. The orthogonality effect is illustrated by FIG. 1 wherein the area of uncertainty is portrayed for two cases: 1(a) range vectors ($R_1(a)$ and $R_2(a)$) at a right angle to each other, and 1(b) both range vectors $R_1(b)$ and $R_2(b)$) lying along the base line. Note that the maximum linear uncertainty of position ($\epsilon b$) or $1(b)$ is several times the maximum uncertainty ($\epsilon a$) of $1(a)$.

The term long-baseline range-range positioning system, is meant to define a system wherein the base-line length is comparable to or larger than the range to the target from either end of the base-line. For mathematical convenience in analyzing a long base-line system, a conservative approximation of the maximum uncertainty may be made by assuming that the wave fronts are linear instead of arcuate. FIG. 2 illustrates the approximating wherein the included angle between the vectors (R1 and R2) from the transducer locations to the target position is labeled $\theta$. Trigonometric analysis reveals that the linear uncertainty ($\epsilon$) is related to the range uncertainty ($\delta$) by the equations:

$$\epsilon/\delta = \sec(\theta/2); \text{ for } \theta \text{ obtuse, and}$$

$$\epsilon/\delta = \sec(\pi - \theta/2); \text{ for } \theta \text{ acute.}$$

The value for $\epsilon/\delta$ is a minimum and equal to $\sqrt{2}$ along the locus of points that satisfy the condition $\theta = \pi/2$ (90°); everywhere else $\epsilon/\delta > \sqrt{2}$. Thus, according to this invention, one of the controlling criterion in designing a long baseline range-range positioning system is the degree of degradation in $\epsilon/\delta$ that is deemed permissible.

The square root of two, ($\sqrt{2}$) is a commonly used factor of permissible degradation, and will be used herein for an example of the design process: set the maximum allowable ratio ($\epsilon/\delta$) max. equal to $\sqrt{2}$x) ($\epsilon/\delta$) min., wherein ($\epsilon/\delta$) min. = $\sqrt{2}$, and compute ($\epsilon/\delta$) max. = 2. Further, $\epsilon/\delta = \sqrt{2}$ only when $\theta = 2\pi/3$ or $\pi/3$ (120° or 60°, respectively). Therefore, the maximum permissible degradation occurs along the loci of points satisfying the above conditions for the value of $\theta$ as plotted in FIG. 3.

Figure 3:
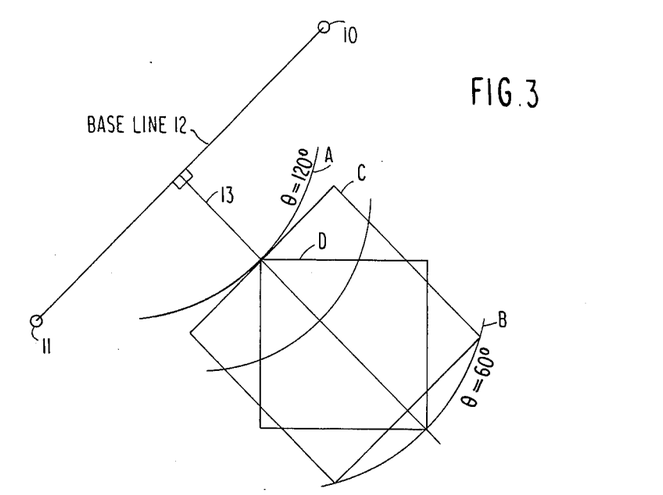
FIG. 3 is a schematic view further illustrating the location of the target areas according to the invention.

The foregoing consideration constrains the target area to lie between curves A and B of FIG. 3. If it is required that the target area to be square in outline, then the maximum and minimum areas that satisfy the criteria are as drawn in FIG. 3 and labeled C and D. With target area C, the perpendicular bisector of the baseline is the perpendicular bisector 13 of the square; while with target area D, the perpendicular bisector of the baseline lies along the diagonal of the square. It is obvious that other rectangular areas may be fitted between the limiting curves A and B and that the target areas need not have straight or linear sides. The surface under the target areas correspond to data surfaces where a large expanse is available to support a clear path between the echo ranging transducers and the target. An example is digital encoding of information from a wall mounted chalkboard wherein the chalk is the target and the information is generated during the course of a lecture. However, the data surface underlying target area C does not permit convenient design of a folded path for ultrasonic wave propagation.

Target area D is convenient to the design of a folded path ultrasonic two-dimension digitizer in the following ways: first, the axes of folding may be maintained parallel to the edges of the target area; and second, acoustic paths from the two transducres are symmetrically located about the diagonal of the square. The first feature produces a physically compact design and the second permits economics in acoustic, electronic and logic (software) design.

Figures 4A, 4B, 4C:
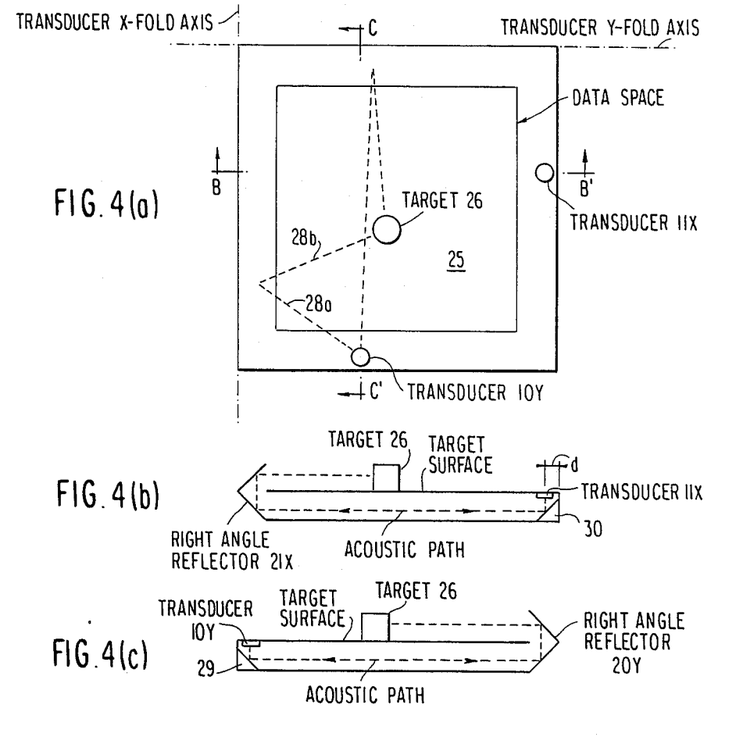
FIG. 4(a) is a plan view of a preferred transducer positioning for target area D of FIG. 3 after folding the transducer beam paths 180 degrees.
FIGS. 4(b) and 4(c) are schematic sectional views through plans B-B' and C-C', respectively.
Figures 5A, 5B, 5C:
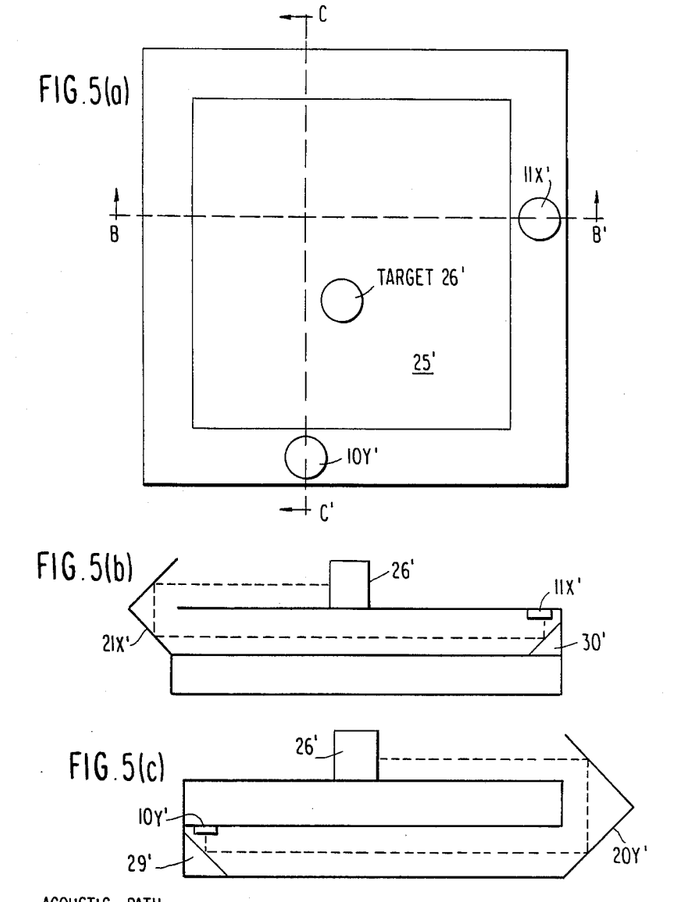
FIGS. 5(a)-5(c) illustrate the further embodiment of the invention where the beam paths before folding are non-coplanar.
Figure 13:
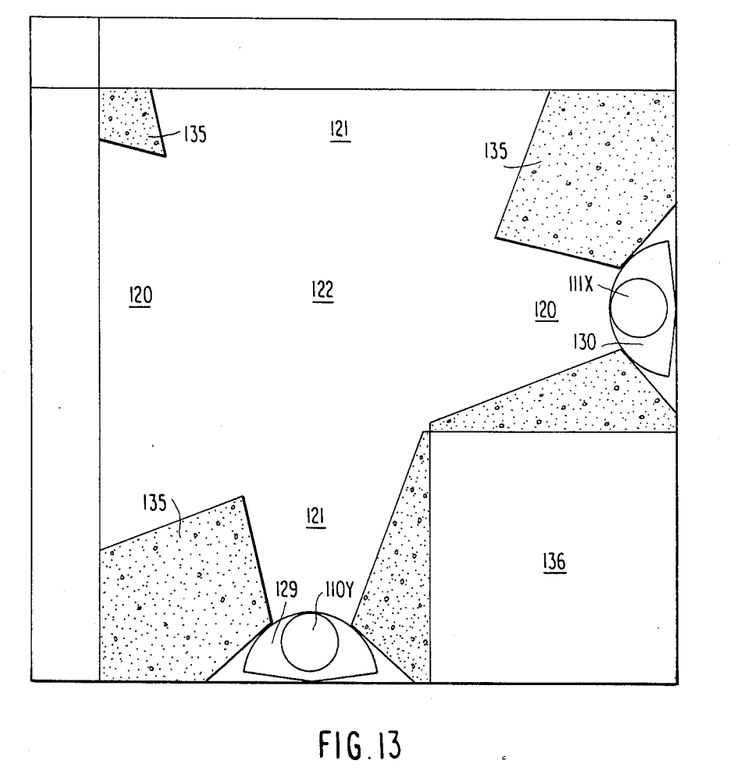
FIG. 13 is a top plan view of a preferred form of the invention where ambiguity and error avoidance is provided by modified acoustic horns.

A plan view of the transducer positions for target area D after folding the paths by 180 degrees is presented in FIG. 4a (and FIG. 13). FIGS. 4b and 4c are section views through planes B-B' and, C-C', respectively, which are normal to the plan view on FIG. 4a. Ultrasonic energy is propogated from the transducers 10Y and 11X to the right angle reflectors 20Y and 21X, respectively, and thence up into the data plane of the target area 25, to the target 26 and is then reflected back along the same paths to the transducer locations. The two-way propagation times are a measure of the range between the target and the respective transducer and are used to compute position of the target in the conventional manner of range-range systems. In FIGS. 4(b) and 4(c) beam transformers 29 and 30 are portions of conical acoustical reflective surfaces and are disclosed in greater detail in my above-identified application.

A problem with the folded path configuration of FIGS. 4b and 4c is related to the transducer beam patterns. The problem, illustrated by FIG. 4a, is that ultrasonic energy on a side lobe path 28-a, 28-b from one of the transducers (10Y) will enter into the folded path of the other transducer and echo off the target with two possible results: (1) it will be detected as if it were in the intended path and give seriously erroneous results, or (2) it will interfere with the echo signal from the intended path and produce a phase shift in the detected signal to produce errors less than a half wavelength of the ultrasound. The first result is easily countered through control of sidelobes, use of automatic gain control, and judicious selection of threshold, as is the usual case with good sonar design practice. The second result can only be ameliorated by such procedures and designs, but never entirely eliminated.

Figures 6, 7A, 7B:
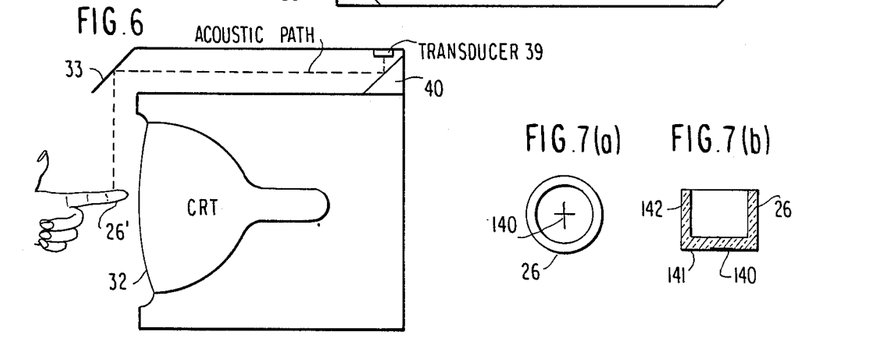
FIG. 6 illustrates an embodiment of the invention where the sonic beam paths are folded about 90 degrees.

Thus, the folded path configuration of FIG. 6 and the intersecting acoustic horns of FIG. 13 essentially do away with the cross talk problem.

The folded paths of FIG. 6 are only coplanar on the target level. In consequence; the paths are distinctly separate but with the penalty of an additional layer (thickness) to the device. Component parts corresponding to FIG. 4 are primed.

It is noted that the data surface or target area 25 may be a flat plate display, such as DC or AC plasma panels, LCD and electroluminescent display panels and the target may be a finger or pointer. In that case, the precision required may not be finer than a half wavelength of the ultrasonic wave and the more compact configuration of FIG. 4 and FIG. 13 is more desirable.

Also, in the case where the target area is the face of a cathode ray tube 32, the path from the transducer 39 to the and transformer 40 may be folded by only 90 degrees by a 45 degree reflector 33 as shown in FIG. 6. The paths are then distinctly separate and cross talk will not be a problem. In this case, the folded path, ultrasonic, two-dimension, digitizer provides an economical means of interaction between a computer and untrained people. Obviously, folding from 180 degrees through any desired angle can be used to practice the invention. Although the drawings illustrate the 180 degree acoustic folding surfaces to be intersecting, it will be appreciated that they may be spaced a short distance so as to accomodate a flat plate display of the type referred to above.

TRANSDUCER DESIGN

High efficiency in the ultrasonic transducers provide higher signal-to-noise ratios and thus greater precision in the range measurements. However, as discussed previously, some applications do not require high precision and cheaper, less efficient, transducers may be employed.

A transducer suitable for low precision applications is the Matsushita Electronic Components Col, Ltd. Model EFR-RAB40K4 which provides a conical beam that is approximately 50-deg wide at the 3 db points when operated at 40 kHz. The Q of the transducer is approximately 16 and consequently it is not suitable for broadband (high resolution) operation. The beam widths best suited for the folded path configuration of Figures 4 and 6 is 40 degrees in the plane parallel to that of the display and as narrow as practical in the normal plane. At 40 kHz, the optimum beamwidth (determined by setting the near-field limit to the distance between the transducer and the reflector) is approximately 10 degrees if the distance is 16 inches. The Matsushita transducer unit provides signal-to-noise ratios less than optimum by the factor:

$$20 \log \left( \frac{10}{50} \times \frac{40}{50} \right) = -16 \text{ db}.$$

As disclosed in my above-identified application, a more efficient transducer arrangement that is applicable to high precision applications includes a Polaroid ® brand electrostatic transducer 10 and a beam transformer 29, 30. The Polaroid ® transducer produces a conical ultrasonic beam at 50 kHz that is approximately 10-deg wide. The beam transformer 29, 30 is a 45 degree cone reflector that is placed in the near field of the transducer as illustrated by FIG. 4. The resulting beam acoustic axis lies in a plane normal to the axis of the cone (horizontal plane) and is in the direction of the displacement (d) of the center of the transducer 10 from the axis of the cone.

It is clear that when no displacement exists (d=o), the resulting beam is omnidirectional in the normal plane; and when the displacement is very large (d→∞), the resulting beam shape closely approximae the shape of the undisturbed transducer beam. The −3 db beam width in the plane containing the reflected acoustic axis and the axis of the cone (the vertical plane) varies from about 10 degrees at d→∞ to about 20 degrees at d=O. Transformed beamwidths are unpredictable in proportion to the unpredictability of the beam widths of the transducers themselves.

To produce the 40 degree beam in the horizontal plane that is optimum for the previously defined folded path configurations, tests indicate that the displacement should be approximately one inch (d=1 in.). The consequent beam width in the vertical plane is no more than 15 degrees and consequently, the resulting loss in signal-to-noise ratio is no more than 20 Log (10/15)= −3.5 db. The Polaroid brand transducer features a low Q ($\approx$5.5) and therefore is more suitable for broadband (high resolution) operation.

ACOUSTIC TARGET

Figure 9A:
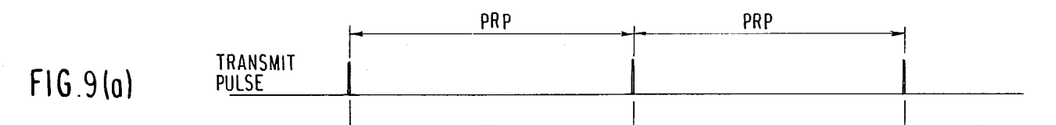
FIGS. 9(a)-9(e) are wave form diagrams illustrating the system timing.
Figure 9B:
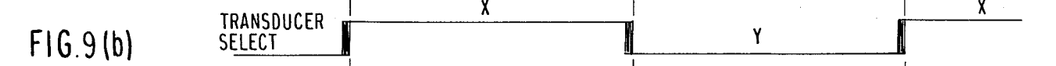

A preferred target shape is a right circular cylinder. The height of the cylinder need be no greater than the height of the acoustic path over the target surface (aboout 1.5 inches with the Polaroid ® transducer). The radius of the cylinder may be as required to achieve a high target strength; however, the radius dimension must be added to the range dimension prior to calculating coordinates of the cursor. As shown in FIG. 9(a) and 9(b), the cursor 26 may take the form of cross hairs 140 on the bottom 141 of a transparent plastic cylinder 142. As shown in FIG. 7, a human finger serves quite well as the target.

ELECTRONICS SYSTEM

Figure 8:
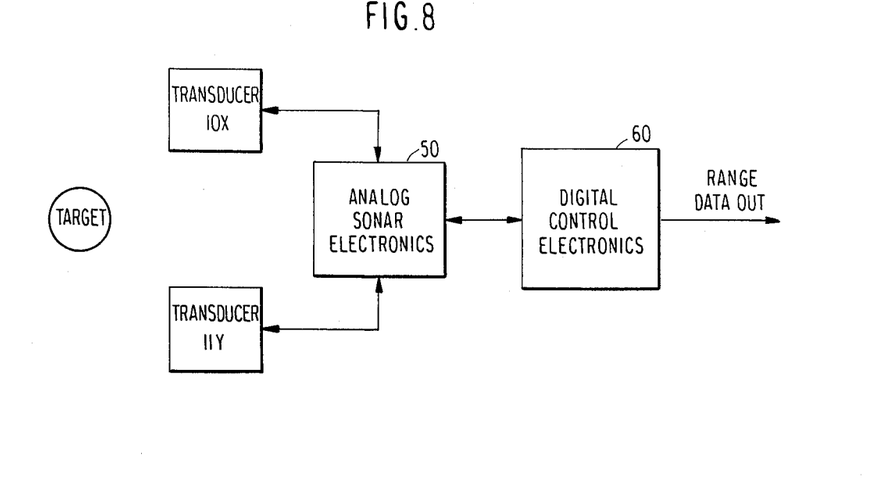
FIG. 8 is a simplified block diagram of the electronic system incorporating the invention.

The system electronics is conventional and includes a digital control section and an analog sonar section. The simplified block diagram of FIG. 8 illustrates the relationship between the electronic sections and the ultrasonics. Pulse power is delivered to the transducers 10X and 10Y in an alternating fashion by the analog section 50 in response to synchronizing signals from the digital section 60. Echo, reverberation and noise signals from the transducers are processed by the analog section to provide precise timing signals to the digital section. In turn, the digital section 60 generates binary numbers that are functions of the ranges to the target from the two transducers. The numbers are subsequently used by special purpose or general purpose computers to compute cartesian coordinate of the cursor in a manner that is common and well known in the art. As is conventional, the circuitry is calibrated to take into account such as air temperature, humidity, etc.

Figure 9C:
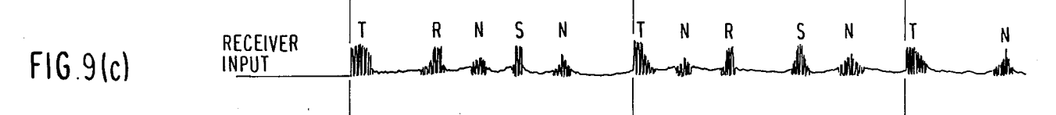

Timing of the several signals is diagrammed in FIGS. 9(a)–(e). The digital section 60 establishes a fixed precise pulse repetition period (PRP) (FIG. 9a) between transmissions of the ultrasonic transducers 10X and 10Y. Just prior to each transmit pulse, the digital section 60 cause the analog section to switch from one transducer to the other (FIG. 9b). The analog section 50 amplifies the received signals and produces pulses with trailing edges that are precisely concurrent with the negative-going zero-crossings of the received ultrasonic signals (FIG. 9c).

Figure 9D:
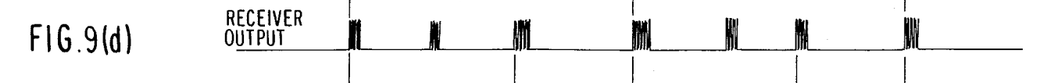

The receiver input includes pulses that are related to the ultrasonic transmissions (T), to spurious reflections and reverberations within the folded path (R), to noise (N) and to the echo signal (S) from the target. The receiver output is thresholded to remove the noise pulses and transformed by a zero-crossing detector (FIG. 9d). Pulses (T) and (R) are ignored in the digital section by appropriate gating of the time counter.

Figure 9E:
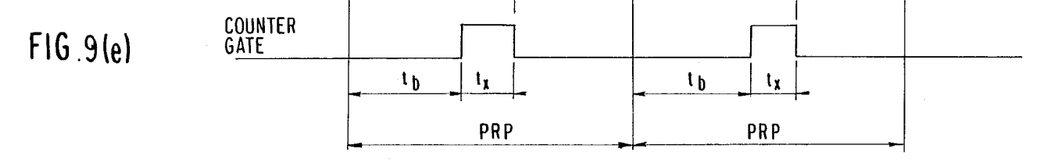

In the digital section, the time counter is turned on at a fixed, precise time ($t_b$) after all (T) and (R) pulses are over for the repetition period. The counter is turned off at the time ($t_x$ or $t_y$ corresponding to the X or Y transducer) of the first negative-going zero-crossing of the echo from the target (9e). Subsequently, a binary representation of $t_x$ or $t_y$ is transmitted as data. The range to the cursor is:

$$\text{Range } (XY) = \frac{c}{2}(t_b + t_{x,y}) + r$$

where r is the radius of the target and c is the speed of sound.

Figure 10:
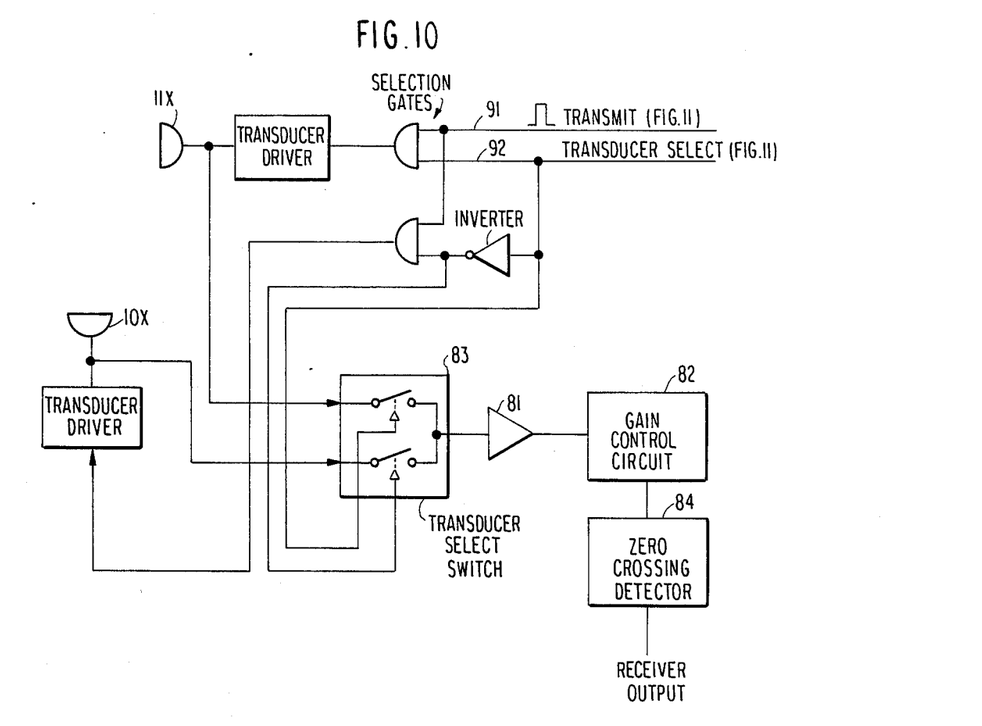
FIG. 10 is a schematic electrical diagram of a preferred form for the analog electronic system of FIG. 7.

FIG. 10 is a schematic diagram of a preferred circuit for the analog electronic section. Standard Polaroid Corporation transmitter circuits are energized alternately by transmit and transducer select signals from the digital section as previously described. Transducer outputs are switched into a four stage receiver 80: a preamplification stage 81 (3240 A), a time-varied gain stage 82 (CA 3006), a buffer stage 23 (3240 B) and a zero-crossing detector stage 84 (LM 3610). The zero-crossing detector is a conventional circuit wherein pin 11 (of LM 3610) is high and pin 9 is low when pin 1 (the input) is low, thus establishing a positive threshold voltage on pin 3. When the voltage on pin 1 exceeds that threshold, the threshold voltage on pin 3 reverts to zero while the output voltage on pin 9 goes high. At the instant that the input voltage on pin 1 goes back through zero, pins 11 and 9 revert to their previous state with the result that the trailing edge of the pulse on pin 9 is a precise timing signal.

Figure 11:
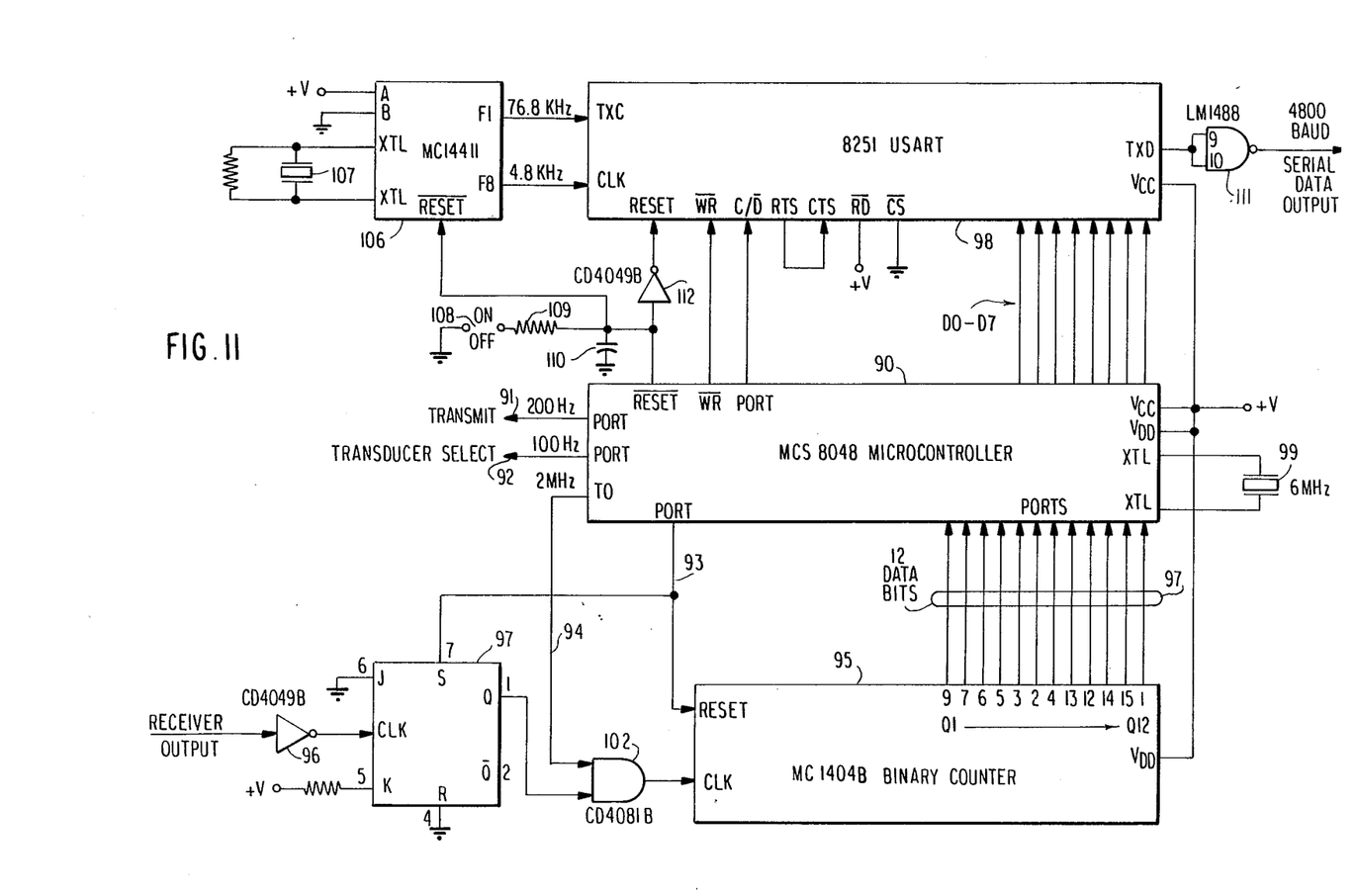
FIG. 11 is a schematic diagram of a preferred circuit for the digital electronic section shown in FIG. 7.

FIG. 11 is a schematic diagram of a preferred circuit for the digital electronic section. A microcontroller 90 (Intel MCS 8048 or equivalent, for example), timed by 6 MHZ crystal 99, provides the synchronizing signals on transmit line 91 and transducer select line 67 to the analog section (FIG. 11) and the reset on line 92 and clock on line 94 signals to the range counter 95. The receiver output is inverted by inverter 96 and fed to a J-K flip-flop 97 in such a manner that the clock signal from the microcontroller 90 is gated off by gate 102 at the time of the first negative-going zero-crossing from the receiver after the counter 95 has been reset to zero.

The output of the counter 95 is sampled at the 12 bit data bus 97 by the microcontroller 90 and used therein to generate data bytes on lines D0–D7 which are subsequently transferred to an 825 USART 98, the USART is a programmable synchronous or asynchronous, receiver transmitter and receives timing signals from timer divider 106 which is driven by crystal 107. A reset circuit comprised of a switch 108, resistor 109 and capacitor 110 initiallizes timer divider 106 and microcontroller 90, and this is inverted by inverter 112 to initialize USART 98. The USART 98, in an asynchronous mode, then converts the data to a serial bit stream which is transmitted via buffer 111 at a 4800 baud rate over a conductor 101 from buffer 102 to the computer (not shown) which is conventional and is used to convert the data into cartesian coordinates using the algorithm shown in FIG. 13. The circuit of FIG. 12 is designed to produce an output compatible with computer standard RS 232C, and frequencies and rates set forth in FIG. 13 are typical and exemplary and not mandatory.

Figure 12:
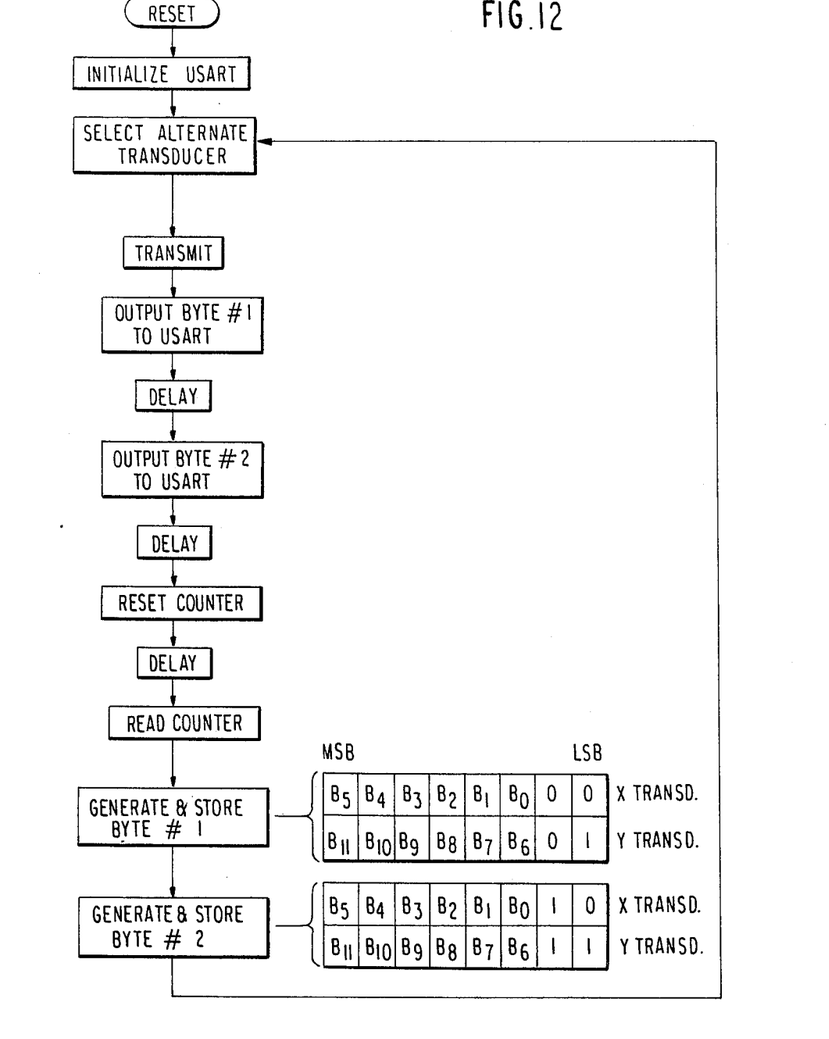
FIG. 12 is a microcontroller logic diagram of algorithm showing the output signal format.

The microcontroller cycles the signals in a manner that conforms to the logic diagram of FIG. 12. Delay times between transmit and reset counter are designed to produce $t_b$ of FIG. 9, and the value of which must be made available to the cartesian-coordinate computer. The baud rate of the USART output must be high enough to transmit all of the data each cycle. In addition to the time interval data ($t_x$ or $t_y$), each transmission must encode the transducer being used (X or Y) and in this example must encode the byte number. The latter requirement rises from the constraints imposed by using 8-bit logic to transmit 12 bit data.

In the embodiment shown in FIG. 13, the coplanar acoustic paths for the ultrasonic beams are acoustic horns 120 and 121 which have a common area 122. The acoustic paths are defined by acoustic absorber material 135 which avoid unwanted reflections and/or reverberations. These acoustic horns couple the ultrasonic energy from and to beam transformers 129 and 130 (corresonding to beam tranformers 29 and 30 of FIG. 4a) and transducer 10Y and 11X, respectively, and the beam folding reflectors 120Y and 121X, respectively. It will be noted that the axes of the beam paths is not symmetrical, which helps to avoid ambiguity and errors. The space 136 may be used to locate electronic circuitboards and the like.

While there has been shown and described the preferred emboidment of the invention, it will be appreciated that other modifications and changes can be made to the invention without departing from the spirit and scope thereof as set forth in the claims appended hereto.

What is claimed:

1. In an acoustic data entry system including a data surface having predetermined edges and a maximum dimension, a pair of sound wave beam transducers for transmitting a pair of sound wave beams along angularly related paths in the space above said data surface and detaching reflected beams from an object in said space above said data surface which are converted to electrical signals corresponding to coordinates of position of said object on said data surface,
   the improvement wherein each said sound wave beam transducer, respectively, is spaced from one of said predetermined edges of said data surface a distance at least equal to said maximum dimension of the data surface so that the beams impinging on said object within the data space are substantially orthogonal.

2. The invention defined in claim 1 wherein said sound waves are in the ultrasonic frequency range and each said angularly related path includes an ultrasonic reflector means at one edge of said data surface.

3. The invention defined in claim 2 wherein said ultrasonic reflector means folds the beam path between said sound wave beam transducers and said data surface.

4. The invention defined in claim 2 wherein said ultrasonic reflector means is at one of said predetermined edges of said data surface and said sound wave beam transducers are below said data surface.

5. The invention defined in claim 1 wherein said data surface is not in the plane of at least one of said sound wave beam transducers.

6. The invention defined in claim 1 wherein said sound wave beam transducers includes an acoustic beam transformer constituted by a portion of a conical surface.

7. The invention defined in claim 1 wherein each said path between each said sound wave beam transducer and its associated predetermined edge of said data surface includes an acoustic horn.

8. The invention defined in claim 7 wherein said acoustic horns are coplanar.

9. The invention defined in claim 7 wherein said data surface is flat and said acoustic horns are parallel to said data surface.

10. The invention defined in claim 1 wherein each of said paths between each of said sound wave beam transducers, respectively, and its associated predetermined edge of said data surface includes an acoustic horn, and each said sound wave beam transducer includes a narrow beam ultrasonic transducer, and a beam transformer feeding ultrasonic energy to and from said narrow beam transducer to and from said horns, respectively.

11. The invention defined in claim 7 wherein each said acoustic horn includes acoustic absorber means at least in part defining said paths.

12. The invention defined in claim 1 wherein each of said sound wave beams is ultrasonic and has an axes, and wherein each said axes of said beams, respectively, is not symmetrical with the axes of said data surface.

13. The invention defined in claim 1 wherein said data surface is rectangular and the respective axes of said sound wave beams are not symmetrical with the respective axes of said data surface.

14. A method of producing coordinates of selected position on a data space defining surface having a predetermined pair of boundaries, each having predetermined length comprising,
   transmitting a first ultrasonic beam from a first distant remote position through a first of said predetermined pair of boundaries and over said surface,
   transmitting a second ultrasonic beam from a second distant remote position through a second of said predetermined boundaries such that each said ultrasonic beam impinge substantially orthogonally on an object within the data space defined by said surface,
   each said ultrasonic beam having a predetermined path and the path of at least one of said ultrasonic beams is folded by a reflector said reflector establishing one of said predetermined boundaries of said data space defining surface, and
   converting reflected ultrasonic energy to signals corresponding to said coordinates of position of an object in said data space over said data space defining surface.

15. A method of producing coordinates of selected position on a data space defining surface having a predetermined pair of boundaries, each having predetermined length comprising,
   transmitting a first ultrasonic beam from a first distant remote position through a first of said predetermined pair of boundaries and over said surface,
   transmitting a second ultrasonic beam from a second distant remote position through a second of said predetermined boundaries such that each said ultrasonic beam impinge substantially orthogonally on an object within the data space defined by said surface,
   causing each said ultrasonic beam to traverse a folded path, and
   converting reflected ultrasonic energy to signals corresponding to said coordinates of position of an object in said data space over said data space defining surface.

16. The method defined in claim 15 wherein the beam traversing the folded path is folded greater than 90 degrees.

17. The method defined in claim 15 wherein each said folded path includes an 180 degree beam direction change.

18. A method of producing coordinates of selected position on a data space defining surface having a predetermined pair of boundaries, each having predetermined length comprising,
   transmitting a first ultrasonic beam from a flat distant remote position through a first of said predetermined pair of boundaries and over said surface,
   transmitting a second ultrasonic beam from a second distant remote position through a second of said predetermined boundaries such that each said ultrasonic beam impinge substantially orthogonally on an object within the data space defined by said surface,
   at least one of said sound beams is coupled from said first distant remote position to its related one of said predetermined pair of boundaries by an acoustic horn, and
   converting reflected ultrasonic energy to signals corresponding to said coordinates of position of an object in said data space over said data space defining surface.

19. A method of producing coordinates of selected position on a data space defining surface having a predetermined pair of boundaries, each having predetermined length comprising,
   transmitting a first ultrasonic beam from a first distant remote position through a first of said predetermined pair of boundaries and over said surface,
   transmitting a second ultrasonic beam from a second distant remote position through a second of said predetermined boundaries such that each said ultrasonic beam impinge substantially orthogonally on an object within the data space defined by said surface,
   each said sound beam is coupled from a generator therefor to a respective predetermined boundary by an acoustic horn, and
   converting reflected ultrasonic energy to signals corresponding to said coordinates of position of an object in said data space over said data space defining surface.

20. A method of producing coordinates of selected position on a data space defining surface having a predetermined pair of boundaries, each having predetermined length comprising,
   transmitting a first ultrasonic beam from a first distant remote position through a first of said predetermined pair of boundaries and over said surface,
   transmitting a second ultrasonic beam from a second distant remote position through a second of said predetermined boundaries such that each said ultrasonic beam impinge substantially orthogonally on an object within the data space defined by said surface,
   each said sound beam is coupled from a generator therefor to a respective predetermined boundary by an acoustic horn, and is folded by a reflector to pass over said surface having predetermined boundaries, and
   converting reflected ultrasonic energy to signals corresponding to said coordinates of position of an object in said data space over said data space defining surface.

21. The method defined in claim 18 wherein each said beam is folded 180 degrees.

22. The invention defined in claim 19 wherein said acoustic horns are coplanar.

23. The invention defined in claim 19 wherein each said acoustic horn is parallel to the other and each said beam is folded 180 degrees.

24. The invention defined in claim 19 wherein said acoustic horns are coplanar and each said ultrasonic beam is folded 180 degrees.

25. A compact ultrasonic position digitizer comprising a pair of ultrasonic send-receive transducers for transmitting a pair of ultrasonic beams along a pair of acoustic intersecting paths, respectively, and acoustic folding means for bending at least one of said ultrasonic beams at an angle up to and including 180 degrees and means connected to said send-receive transducer for determining location of an object located within the intersection portions of the said acoustic paths defining a data space.

26. The compact ultrasonic position digitizer defined in claim 25 including means for folding each said acoustic path 180 degrees.

27. The compact ultrasonic position digitizer defined in claim 25 including means for folding each said acoustic path 180 degrees and wherein a portion of each path from the transducer to said means for folding is common and coplanar.

28. The compact ultrasonic position digitizer defined in claim 25 including means for folding each said acoustic path 180 degrees and wherein a portion of each path from the transducer to said means for folding is common and coplanar and includes acoustic horn means.

29. The invention defined in claim 28 wherein said acoustic horn means is defined at least in part by acoustic absorber means.

30. The compact ultrasonic position digitizer defined in claim 28 wherein said paths are not symmetrically oriented with respect to the respective axes of said intersecting portions of said acoustic paths defining said data space.

* * * * *